(12) United States Patent
Yasumura

(10) Patent No.: US 6,356,465 B2
(45) Date of Patent: Mar. 12, 2002

(54) SWITCHING POWER SUPPLY APPARATUS WITH ACTIVE CLAMP CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/843,327

(22) Filed: Apr. 26, 2001

(30) Foreign Application Priority Data

Apr. 28, 2000 (JP) ........................................ 2000-134281

(51) Int. Cl.[7] .............................................. H02M 3/335
(52) U.S. Cl. .................................................. 363/21.02
(58) Field of Search ............................. 363/20, 21.02, 363/21.03, 97, 131

(56) References Cited

U.S. PATENT DOCUMENTS

| | | | |
|---|---|---|---|
| 5,712,772 A | * | 1/1998 | Telefus et al. ................ 363/21 |
| 5,880,943 A | * | 3/1999 | Yokoyama .................... 363/56 |
| 5,923,543 A | * | 7/1999 | Choi ............................ 363/21 |
| 6,205,037 B1 | * | 3/2001 | Fitzgerald, Jr. .............. 363/21 |
| 6,262,897 B1 | * | 7/2001 | Yasmura .................. 363/21.02 |

* cited by examiner

Primary Examiner—Adolf Deneke Berhane
(74) Attorney, Agent, or Firm—Jay H. Maioli

(57) ABSTRACT

An active clamp circuit is provided on the primary side of a complex resonance type switching converter having a parallel resonant circuit on the primary side and a parallel resonant circuit or a series resonant circuit on the secondary side. The active clamp circuit clamps a parallel resonance voltage pulse generated across a primary-side parallel resonant capacitor to thereby lower the level of the parallel resonance voltage pulse. Thus, withstand voltage of components such as switching devices and the primary-side parallel resonant capacitor can be lowered.

3 Claims, 11 Drawing Sheets

FIG. 6
PRIOR ART
PIT
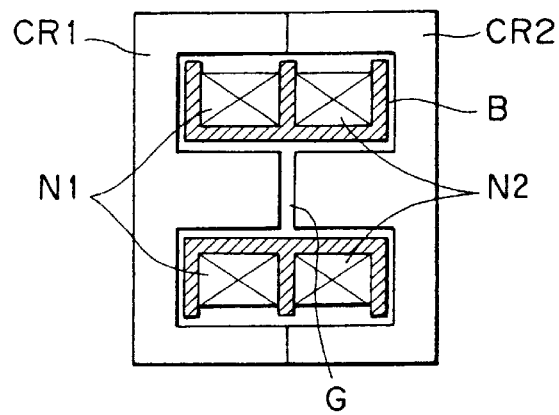
PRIOR ART
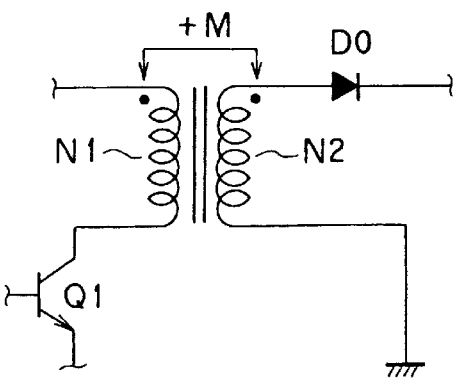
FIG. 7A
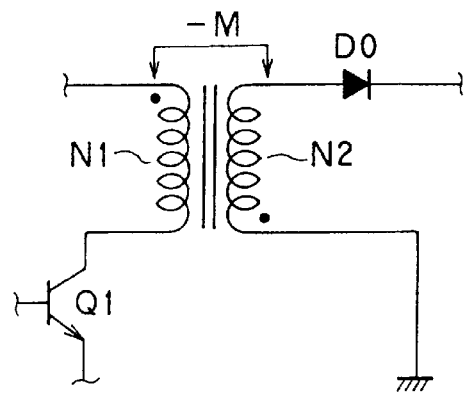
FIG. 7B

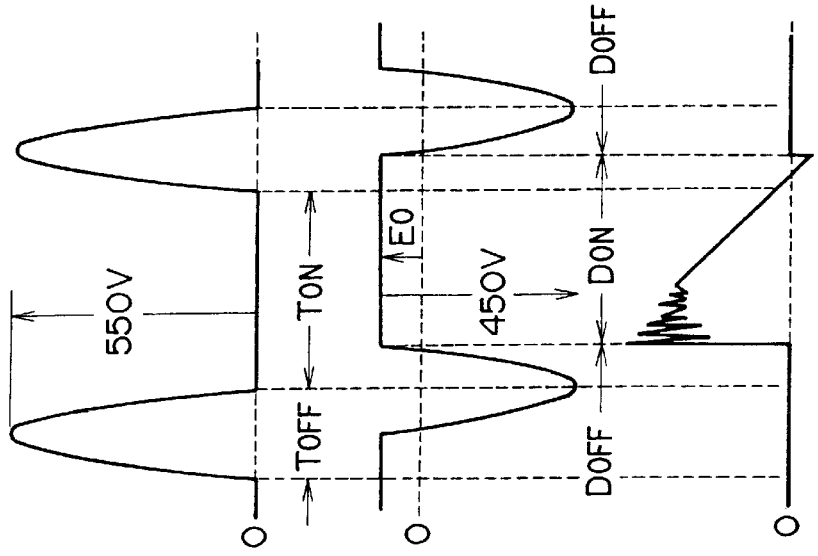

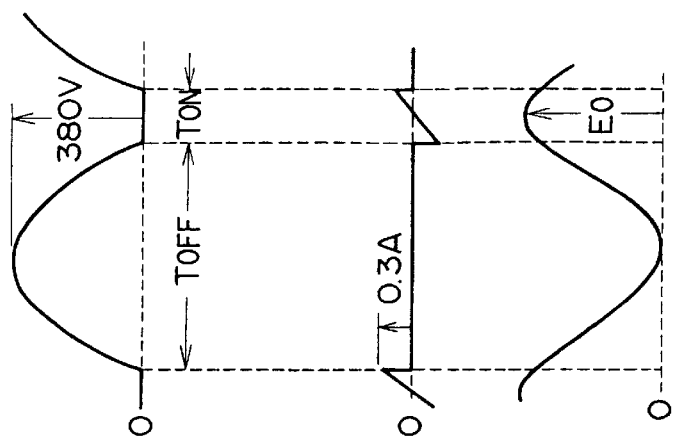
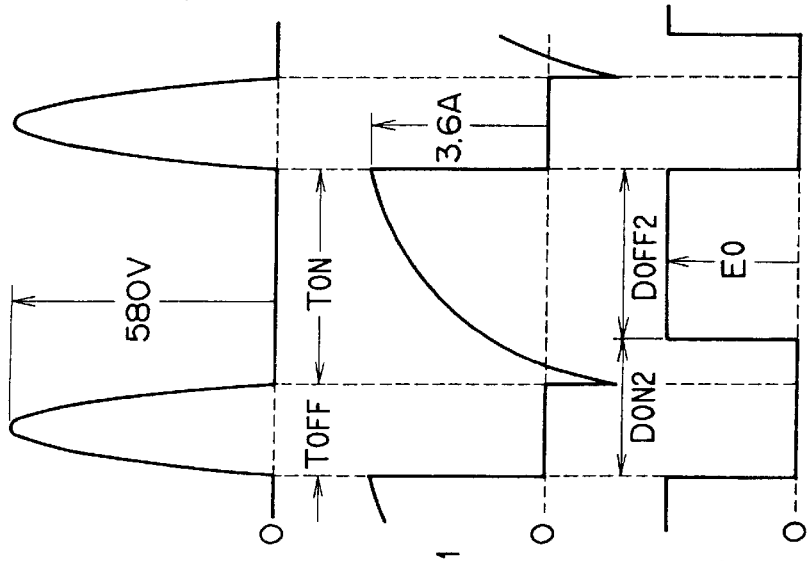
PRIOR ART

US 6,356,465 B2

SWITCHING POWER SUPPLY APPARATUS WITH ACTIVE CLAMP CIRCUIT

BACKGROUND OF THE INVENTION

The present invention relates to a switching power supply circuit to be used as a power supply for various electronic apparatus.

Switching converters such as flyback converters and forward converters are widely known as switching power supply circuits. These switching converters form a rectangular waveform in switching operation, and therefore there is a limit to suppression of switching noise. It is also known that because of their operating characteristics, there is a limit to improvement of power conversion efficiency. Hence, various switching power supply circuits formed by resonance type converters have been proposed. A resonance type converter makes it possible to readily obtain high power conversion efficiency, and to achieve low noise because the resonance type converter forms a sine-wave waveform in switching operation. The resonance type converter has another advantage of being able to be formed by a relatively small number of parts.

FIG. 5 is a circuit diagram showing an example of a prior art switching power supply circuit. The power supply circuit shown in FIG. 5 is supplied with a commercial alternating-current input voltage VAC, and then a rectified and smoothed voltage Ei is generated by a full-wave rectifier circuit comprising a bridge rectifier circuit Di and a smoothing capacitor Ci.

A self-excited voltage resonance type converter circuit that includes a switching device Q1 and performs switching operation by a so-called single-ended system is provided as a switching converter for interrupting the rectified and smoothed voltage Ei inputted from the full-wave rectifier circuit. A BJT (Bipolar Junction Transistor), which is a high withstand voltage bipolar transistor, is employed as the voltage resonance type converter in this case.

An isolating converter transformer PIT transmits switching output of the switching device Q1 to the secondary side of the switching power supply circuit. As shown in FIG. 6, the isolating converter transformer PIT has an E-E-shaped core formed by combining E-shaped cores CR1 and CR2 made for example of a ferrite material in such a manner that magnetic legs of the core CR1 are opposed to magnetic legs of the core CR2. A primary winding N1 and a secondary winding N2 are wound around a central magnetic leg of the E-E-shaped core in a state divided from each other by using a dividing bobbin B. Also, a gap G is formed in the central magnetic leg, as shown in FIG. 6, to provide loose coupling at a required coupling coefficient. The gap G can be formed by making the central magnetic leg of each of the E-shaped cores CR1 and CR2 shorter than two outer magnetic legs of each of the E-shaped cores CR1 and CR2. The coupling coefficient is set at 0.85, for example, to provide a loosely coupled state, whereby a saturated state is not readily obtained.

As shown in FIG. 5, an ending point of the primary winding N1 of the isolating converter transformer PIT is connected to a collector of the switching device Q1, while a starting point of the primary winding N1 is connected to a positive electrode of the smoothing capacitor Ci via a resonance current detecting winding ND. Hence, the primary winding N1 is supplied with the switching output of the switching device Q1, whereby an alternating voltage whose cycle corresponds to the switching frequency of the switching device Q1 occurs in the primary winding N1.

An alternating voltage induced by the primary winding N1 occurs in the secondary winding N2 on the secondary side of the isolating converter transformer PIT. In this case, a secondary-side parallel resonant capacitor C2 is connected in parallel with the secondary winding N2, and therefore leakage inductance L2 of the secondary winding N2 and capacitance of the secondary-side parallel resonant capacitor C2 form a parallel resonant circuit. The parallel resonant circuit converts the alternating voltage induced in the secondary winding N2 into a resonance voltage, whereby voltage resonance operation is obtained on the secondary side.

The power supply circuit is provided with a parallel resonant circuit to convert switching operation into voltage resonance type operation on the primary side, and the parallel resonant circuit to provide voltage resonance operation on the secondary side. The switching converter provided with resonant circuits on the primary side and the secondary side as described above is referred to as a "complex resonance type switching converter."

As for secondary-side operation of the isolating converter transformer PIT, mutual inductance M between inductance L1 of the primary winding N1 and inductance L2 of the secondary winding N2 becomes +M or −M, depending on winding direction of the primary winding N1 and the secondary winding N2, a connecting relation of a rectifier diode D0, and change in polarity of the alternating voltage induced in the secondary winding N2. For example, an equivalent of a circuit shown in FIG. 7A has a mutual inductance of +M, while an equivalent of a circuit shown in FIG. 7B has a mutual inductance of −M. This will be applied to the secondary-side operation of the isolating converter transformer PIT shown in FIG. 5. When the alternating voltage obtained at the secondary winding N2 has a positive polarity, an operation that causes rectified current to flow in the bridge rectifier circuit DBR can be considered a +M operation mode, or forward operation, whereas when the alternating voltage obtained at the secondary winding N2 has a negative polarity, an operation that causes rectified current to flow in the bridge rectifier diode DBR can be considered a −M operation mode, or flyback operation. Every time the alternating voltage obtained at the secondary winding N2 becomes positive or negative, the operation mode of the mutual inductance becomes +M or −M, respectively.

With such a configuration, power increased by effects of the primary-side parallel resonant circuit and the secondary-side parallel resonant circuit is supplied to a load side, and accordingly the power supplied to the load side is increased as much, thereby improving a rate of increase of maximum load power. This is achieved because as described with reference to FIG. 5, the gap G is formed in the isolating converter transformer PIT to provide loose coupling at a required coupling coefficient, and thereby a saturated state is not readily obtained.

A base of the switching device Q1 is connected to a positive electrode side of the smoothing capacitor Ci via a base current limiting resistance RB and a starting resistance RS, so that base current at the start of power supply is taken from a line of the rectified and smoothed voltage. A clamp diode DD inserted between the base of the switching device Q1 and a primary-side ground forms a path of clamp current that flows during the off period of the switching device Q1. The collector of the switching device Q1 is connected to one end of the primary winding N1 of the isolating converter transformer PIT, while an emitter of the switching device Q1 is grounded.

A parallel resonant capacitor Cr is connected in parallel with the collector and emitter of the switching device Q1. Also in this case, capacitance of the parallel resonant capacitor Cr and leakage inductance L1 of the primary winding N1 side of the isolating converter transformer PIT form a primary-side parallel resonant circuit of the voltage resonance type converter.

An orthogonal type control transformer PRT shown in FIG. 5 is a saturable reactor provided with the resonance current detecting winding ND, a driving winding NB, and a control winding NC. The orthogonal type control transformer PRT is provided to drive the switching device Q1 and effect control for constant voltage. The structure of the orthogonal type control transformer PRT is a cubic core, not shown in the figure, formed by connecting two cores each having four magnetic legs with each other at ends of the magnetic legs. The resonance current detecting winding ND and the driving winding NB are wound around two magnetic legs of the cubic core in the same winding direction, and the control winding NC is wound in a direction orthogonal to the resonance current detecting winding ND and the driving winding NB.

In this case, the resonance current detecting winding ND of the orthogonal type control transformer PRT is inserted in series between the positive electrode of the smoothing capacitor Ci and the primary winding N1 of the isolating converter transformer PIT, so that the switching output of the switching device Q1 is transmitted to the resonance current detecting winding ND via the primary winding N1. The switching output obtained by the resonance current detecting winding ND of the orthogonal type control transformer PRT is induced in the driving winding NB via transformer coupling, whereby an alternating voltage is generated as driving voltage in the driving winding NB. The driving voltage is outputted as driving current to the base of the switching device Q1 from a series resonant circuit of NB and CB, which forms a self-oscillation driving circuit, via the base current limiting resistance RB. Thus, the switching device Q1 performs switching operation at a switching frequency determined by the resonance frequency of,the series resonant circuit. Then the switching output obtained at the collector of the switching device Q1 is transmitted to the primary winding N1 of the isolating converter transformer PIT.

A half-wave rectifier circuit comprising a diode D0 and a smoothing capacitor C0 is provided for the secondary winding N2 on the secondary side of the power supply circuit, so that a secondary-side direct-current output voltage E0 is obtained by half-wave rectifying operation that comprises only a forward operation. In this case, the secondary-side direct-current output voltage E0 is also inputted from a branch point to a control circuit 1, and the control circuit 1 uses the direct-current output voltage E0 as a detection voltage.

The control circuit 1 variably controls inductance LB of the driving winding NB wound in the orthogonal type control transformer PRT by changing the level of a control current flowing through the control winding NC according to change in the level of the secondary-side direct-current output voltage E0. This results in a change in resonance conditions of the series resonant circuit including the inductance LB of the driving winding NB in the circuit for self-oscillation driving of the switching device Q1. This means an operation of changing the switching frequency of the switching device Q1, by which the secondary-side direct-current output voltage is stabilized. Also in such a configuration for constant-voltage control including the orthogonal type control transformer PRT, the switching converter on the primary side is of voltage resonance type, and therefore the power supply circuit performs operation by the complex control method, in which the power supply circuit variably controls the switching frequency and at the same time controls the conduction angle of the switching device within a switching cycle.

FIGS. 8A, 8B, 8C, 8D, 8E, and 8F are waveform diagrams showing operation of the power supply circuit shown in FIG. 5. FIGS. 8A, 8B, and 8C each show operation of the power supply circuit at an alternating input voltage VAC=100 V and a maximum load power Pomax=200 W. FIGS. 8D, 8E, and 8F each show operation of the power supply circuit at an alternating input voltage VAC=100 V and a minimum load power Pomin=0 W, or no load.

When the switching device Q1 performs switching operation on the primary side, the primary-side parallel resonant circuit performs resonant operation during the period TOFF during which the switching device Q1 is turned off. Thus, as shown in FIGS. 8A and 8D, a parallel resonance voltage V1 across the parallel resonant capacitor Cr forms a sinusoidal resonance pulse waveform during the period TOFF. In the case of the complex resonance type converter having a parallel resonant circuit as a secondary-side resonant circuit, the period TOFF during which the switching device Q1 is turned off is fixed, while the period TON during which the switching device Q1 is turned on is changed, as shown in the figures.

The voltage resonance type converter performs switching operation at the timing shown in the figures on the primary side, and thereby the rectifier diode D0 on the secondary side performs switching and rectifying operation on the alternating voltage induced in the secondary winding N2. In this case, as shown in FIGS. 8B and 8E, a voltage Vo across the secondary winding N2 is clamped at a level of the secondary-side direct-current output voltage E0 during a period DON during which the rectifier diode D0 is turned on, while the voltage Vo forms a sinusoidal pulse waveform in a direction of negative polarity due to resonance effect of the secondary-side parallel resonant circuit during a period DOFF during which the rectifier diode D0 is turned off. As shown in FIGS. 8C and 8F, a secondary-side rectified current I0 to be stored in the smoothing capacitor C0 via the rectifier diode D0 steeply rises at the start of the period DON and thereafter gradually lowers its level, thus forming substantially a sawtooth waveform.

A comparison of FIG. 8A with FIG. 8D indicates that switching frequency fs is controlled so as to rise as load power Po is decreased, and the switching frequency fs is changed while fixing the period TOFF at a constant length and changing the period TON, during which the switching device Q1 is turned on.

The voltage resonance type converter formed as shown in FIG. 5 changes the level of the parallel resonance voltage V1 according to variation in load power. For example, the parallel resonance voltage V1 is 550 Vp at a maximum load power Pomax=200 W, whereas the parallel resonance voltage V1 becomes 300 Vp at a minimum load power Pomin=0 W. This means that the parallel resonance voltage V1 has a tendency to rise as the load power becomes heavier. Similarly, the peak level of the voltage Vo across the secondary winding N2 obtained during the period DOFF has a tendency to increase as the load power becomes heavier. In this case, the voltage Vo is 450 Vp at a maximum load power Pomax=200 W, whereas the voltage Vo is 220 Vp at a minimum load power Pomin=0 W.

As characteristics of the power supply circuit shown in FIG. 5, FIG. 9 shows characteristics of variations in the switching frequency fs, the period TOFF and the period TON within a switching cycle, and the parallel resonance voltage V1 with respect to the alternating input voltage VAC at a maximum load power Pomax=200 W.

FIG. 9 shows that the switching frequency fs is changed within a range of fs=110 KHz to 140 KHz for the alternating input voltage VAC=90 V to 140 V. This indicates an operation of stabilizing variation in the secondary-side direct-current output voltage E0 according to variation in direct-current input voltage. As for variation in the alternating input voltage VAC, the switching frequency is controlled so as to rise as the level of the alternating input voltage VAC is increased.

As for the period TOFF and the period TON within one switching cycle, the period TOFF is constant, as contrasted with the switching frequency fs, whereas the period TON is reduced so as to form a quadratic curve as the switching frequency fs is increased. This also indicates an operation for controlling the switching frequency by the complex control method.

The parallel resonance voltage V1 also changes according to variation in the commercial alternating-current power VAC; as shown in FIG. 9, the level of the parallel resonance voltage V1 rises as the alternating input voltage VAC is increased.

FIG. 10 shows another example of a complex resonance type switching converter provided with a series resonant circuit on the secondary side. As in the case of the power supply circuit shown in FIG. 5, the power supply circuit of FIG. 10 is provided with a self-excited voltage resonance type converter that performs single-ended operation on the primary side.

Also in this case, a series resonant capacitor Cs is connected in series with a starting point of a secondary winding N2 on the secondary side of the power supply circuit to form a secondary-side series resonant circuit. The power supply circuit in this case is provided with a bridge rectifier circuit DBR as a secondary-side rectifier circuit. The starting point of the secondary winding N2 is connected to a positive electrode input terminal of the bridge rectifier circuit DBR via the series resonant capacitor Cs, and the starting point of the secondary winding N2 is connected to a negative electrode input terminal of the bridge rectifier circuit DBR.

In this circuit configuration, an alternating voltage obtained in the secondary winding N2, that is, resonance output of the secondary-side series resonant circuit is subjected to full-wave rectification by the bridge rectifier circuit DBR, and then stored in a smoothing capacitor C0, whereby a secondary-side direct-current output voltage E0 is obtained.

Also in this case, the secondary-side direct-current output voltage E0 is inputted from a branch point to a control circuit 1, and the control circuit 1 uses the inputted direct-current output voltage E0 as a detection voltage for constant-voltage control.

FIGS. 11A. 11B, 11C, 11D, 11E, and 11F are waveform diagrams showing operation of the power supply circuit shown in FIG. 10. FIGS. 11A, 11B, and 11C each show operation of the power supply circuit at an alternating input voltage VAC=100 V and a maximum load power Pomax=200 W. FIGS. 11D, 11E, and 11F each show operation of the power supply circuit at an alternating input voltage VAC=100 V and a minimum load power Pomin=0 W, or no load.

As shown in FIGS. 11A and 11D, a parallel resonance voltage V1 obtained across the parallel resonant capacitor Cr by switching operation of a switching device Q1 forms a sinusoidal resonance pulse waveform during a period TOFF. In the case of the complex resonance type converter having a series resonant circuit as a secondary-side resonant circuit, the period TOFF during which the switching device Q1 is turned off is changed, as shown in the figures.

Waveforms of FIGS. 11A and 11D show that also in this case, switching frequency fs is controlled so as to rise as load power Po is decreased. Also, the switching frequency fs (switching cycle) is changed by varying a period TON during which the switching device Q1 is turned on within one switching cycle.

The circuit formed as shown in FIG. 10 has a tendency to raise the level of the parallel resonance voltage V1 as the load power becomes heavier. In this case, the parallel resonance voltage V1 is 580 Vp at a maximum load power Pomax=200 W, whereas the parallel resonance voltage V1 is 380 Vp at a minimum load power Pomin=0 W.

As shown in FIGS. 11B and 11E, a switching output current IQ1 flowing through a drain or a collector of the switching device Q1 is in synchronism with timing of the periods TOFF and TON. Specifically, the switching output current IQ1 is at a zero level during the period TOFF, and the switching output current IQ1 flows in a manner shown by the waveforms of FIGS. 11B and 11E during the period TON. Also in the case of this circuit configuration, the switching output current IQ1 has a tendency to increase as the load power Po becomes heavier.

In this case, the switching output current IQ1 is 3.6 A at a maximum load power Pomax=200 W, whereas the switching output current IQ1 is 0.3 A at a minimum load power Pomin=0 W.

Operation on the secondary side is shown as a voltage V0 across the secondary winding N2 in FIGS. 11C and 11F. According to the figures, the voltage provides a rectangular pulse clamped at the level of the secondary-side direct-current output voltage E0 during the period DON at a maximum load power Pomax=200 W, while at a minimum load power Pomin=0 W, the voltage provides a sine wave having a switching cycle of the primary side and whose peak level is clamped at the level of the secondary-side direct-current output voltage E0.

As characteristics of the power supply circuit shown in FIG. 10, FIG. 12 shows characteristics of variations in the switching frequency fs, the period TOFF and the period TON within a switching cycle, and the parallel resonance voltage V1 with respect to alternating input voltage VAC at a maximum load power Pomax=200 W.

FIG. 12 shows that the switching frequency fs is changed within a range of fs=110 KHz to 160 KHz for the alternating input voltage VAC=90 V to 140 V. This indicates an operation of stabilizing variation in the secondary-side direct-current output voltage E0 according to variation in direct-current input voltage. Also in this case, the switching frequency is controlled so as to rise as the level of the alternating input voltage VAC is increased.

Under conditions of a constant load, for example, the period TOFF within one switching cycle is constant, as contrasted with the switching frequency fs, whereas the period TON within one switching cycle is reduced as the switching frequency fs is increased. This also indicates an operation for controlling the switching frequency by the complex control method.

As shown in FIG. 12, the parallel resonance voltage V1 changed according to variation in commercial alternating-current power VAC is lowered to about 600 V as the alternating input voltage VAC is increased within a range of the alternating input voltage VAC=80 to 100 V, and the parallel resonance voltage V1 is raised for the alternating input voltage VAC=more than 100 V.

SUMMARY OF THE INVENTION

The power supply circuit shown in FIG. 5 has the following problems. For example, the peak level of the parallel resonance voltage V1 is changed according to load conditions and variation in the alternating input voltage VAC, as is shown in FIG. 8. When the level of the alternating input voltage VAC as the 100-V commercial alternating-current power AC for example rises to 140 V under conditions of a heavy load approximating the maximum load power, in particular, the parallel resonance voltage V1 rises to 700 Vp at the maximum.

Therefore, in order to deal with a 100-V commercial alternating-current power At, a product having a withstand voltage of 800 V needs to be selected for the parallel resonant capacitor Cr and the switching device Q1 supplied with the parallel resonance voltage V1, while in order to deal with a 200-V commercial alternating-current power AC, a product having a withstand voltage of 1200 V needs to be selected for the parallel resonant capacitor Cr and the switching device Q1. This results in large size of both the parallel resonant capacitor Cr and the switching device Q1, and hence their cost is also increased.

Characteristics of the switching device are degraded as its withstand voltage becomes higher. For example, a BJT (Bipolar Junction Transistor) as the switching device will increase its saturation voltage, storage time, fall time, and the like. Thus, a product having a high withstand voltage selected for the switching device Q1 increases power loss resulting from switching operation, and also reduces power conversion efficiency.

In cases where the secondary-side direct-current output voltage is stabilized by the complex control method, when an abnormal condition of a short circuit in the load on the secondary side occurs, the control system of the power supply circuit operates so as to lower the switching frequency. As is understood from the waveforms shown in FIG. 8, in a condition of a low switching frequency, the period TON during which the switching device is turned on is lengthened, and therefore the levels of the voltage V1 and the currents applied to the switching device Q1 and the parallel resonant capacitor Cr, for example, are increased. Thus, in order to deal with a short-circuited load, it is necessary to provide the power supply circuit with an overvoltage protection circuit and an overcurrent protection circuit for protecting the switching device by limiting a high level of voltage and current generated at the time of the short circuit. Provision of the overvoltage protection circuit and the overcurrent protection circuit also hinders reduction of size and cost of the power supply circuit.

In order to solve the problems described above, according to the present invention, there is provided a switching power supply circuit comprised as follows. The switching power supply circuit according to the present invention comprises a switching means including a main switching device for interrupting an inputted direct-current input voltage for output; a primary-side parallel resonant capacitor for forming a primary-side parallel resonant circuit that converts operation of the switching means into voltage resonance type operation; and an isolating converter transformer for transmitting an output of the switching means obtained on a primary side of the isolating converter transformer to a secondary side thereof, the isolating converter transformer being formed so as to have loose coupling at a required coupling coefficient between the primary side and the secondary side. The switching power supply circuit according to the present invention further comprises a secondary-side resonant circuit formed by connecting a secondary-side resonant capacitor to a secondary winding of the isolating converter transformer; a direct-current output voltage generating means for rectifying an alternating voltage inputted from the secondary winding of the isolating converter transformer and thereby providing a secondary-side direct-current output voltage; and a switching driving means for effecting control for constant voltage by driving the switching means for switching operation such that switching frequency of the switching means is variably controlled according to level of the secondary-side direct-current output voltage, and at the same time an on period of the switching means within one switching cycle is variably controlled while an off period thereof is fixed. The switching power supply circuit according to the present invention further includes an active clamp means for clamping a primary-side parallel resonance voltage generated across the primary-side parallel resonant capacitor, the active clamp means including an auxiliary switching device that is driven to perform switching operation during the off period of the switching means.

This configuration is that of a so-called complex resonance type switching converter provided with a primary-side parallel resonant circuit for forming a voltage resonance type converter on the primary side and a secondary-side resonant circuit formed by a secondary winding and a secondary-side resonant capacitor on the secondary side. Control for constant voltage is effected by variably controlling the switching frequency of the switching means such that the off period of the switching means within one switching cycle is fixed and the on period of the switching means is changed. The switching power supply circuit is provided on the primary side with the active clamp means for clamping the parallel resonance voltage generated during the off period of the switching means, and thereby lowers the level of the parallel resonance voltage. Therefore, products having lower withstand voltage may be used for components such as the switching devices and the primary-side parallel resonant capacitor.

BRIEF DESCRIPTION OF THE DRAWINGS

FIG. 6 is a sectional view of an isolating converter transformer in FIG. 5;

FIGS. 7A and 7B are equivalent circuit diagrams of assistance in explaining operations when mutual inductance of the isolating converter transformer of FIG. 6 is +M and −M;

FIGS. 8A, 8B, 8C, 8D, 8E, and 8F are waveform diagrams showing operation of the switching power supply circuit shown in FIG. 5;

FIGS. 11A, 11B, 11C, 11D, 11E, and 11F are waveform diagrams showing operation of the switching power supply circuit shown in FIG. 10.

DETAILED DESCRIPTION OF THE PREFERRED EMBODIMENT

Figure 1:
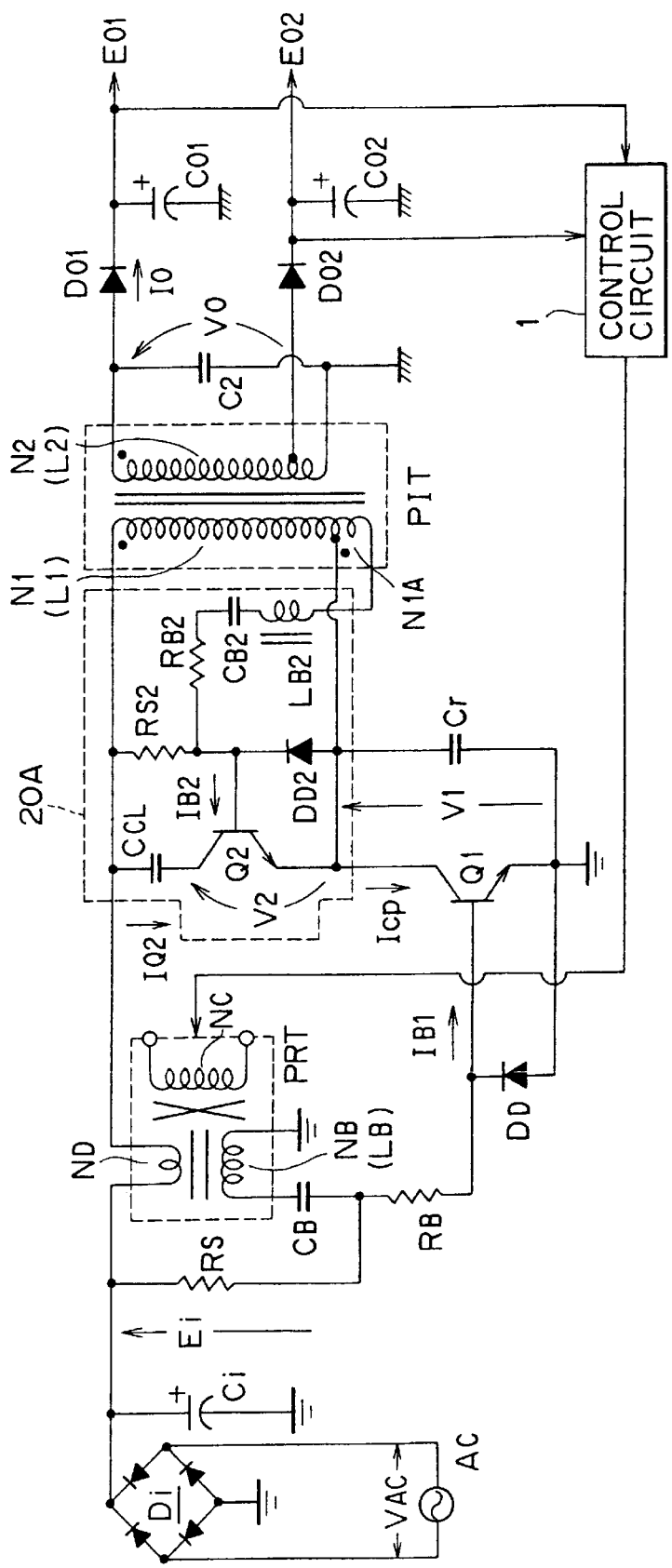
FIG. 1 is a circuit configuration diagram of a switching power supply circuit according to a first embodiment of the present invention.

FIG. 1 is a circuit configuration diagram of a power supply circuit according to a first embodiment of the present invention. The power supply circuit shown in FIG. 1 is a complex resonance type switching converter provided with a voltage resonance type converter on the primary side and a parallel resonant circuit on the secondary side. The primary-side voltage resonance type converter has a single-ended configuration including one switching device. In the power supply circuit shown in the figure, the same parts as in FIG. 5 are identified by the same reference numerals, and their description will be omitted.

Figure 5:
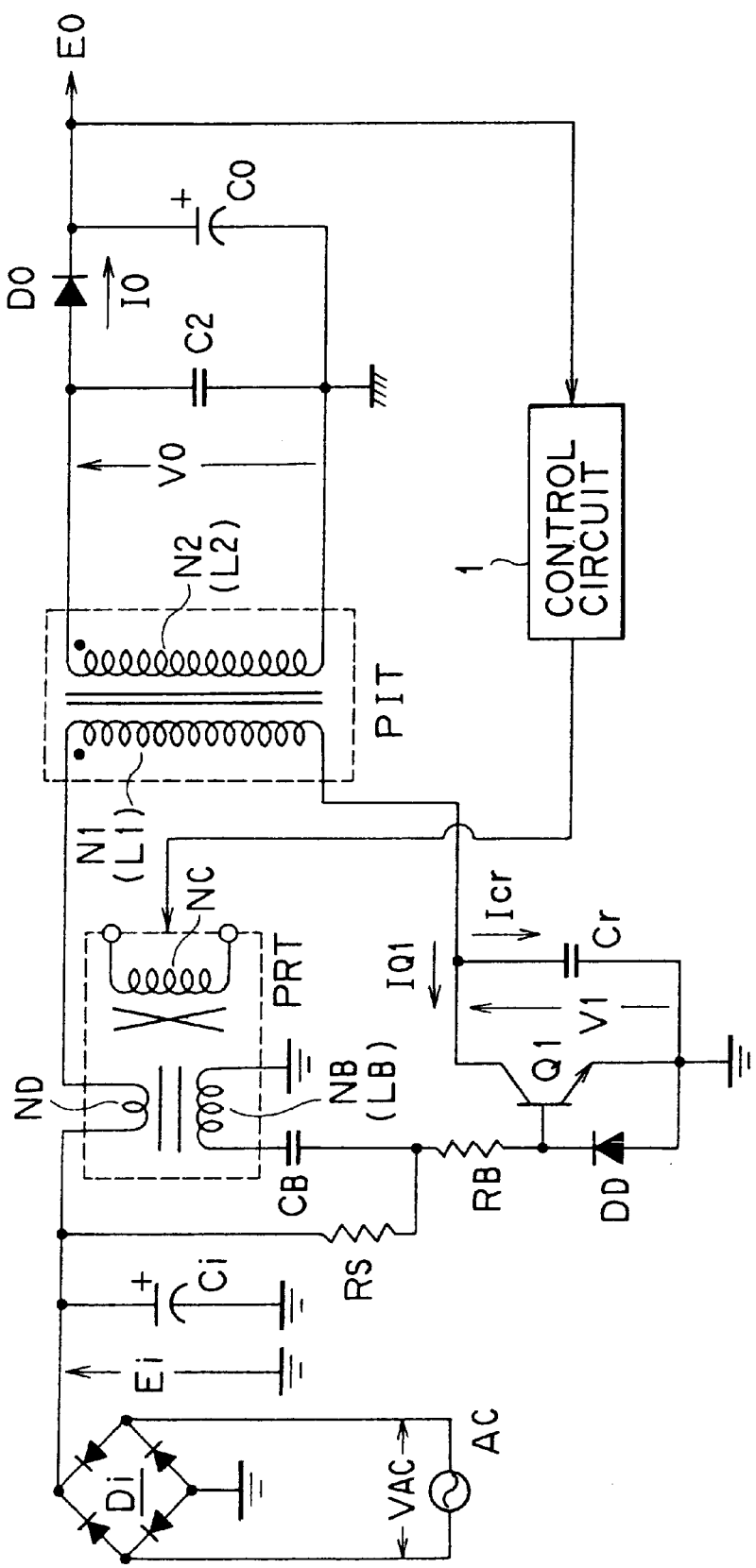
FIG. 5 is a circuit diagram showing a configuration example of a prior art switching power supply circuit.
Figure 9:
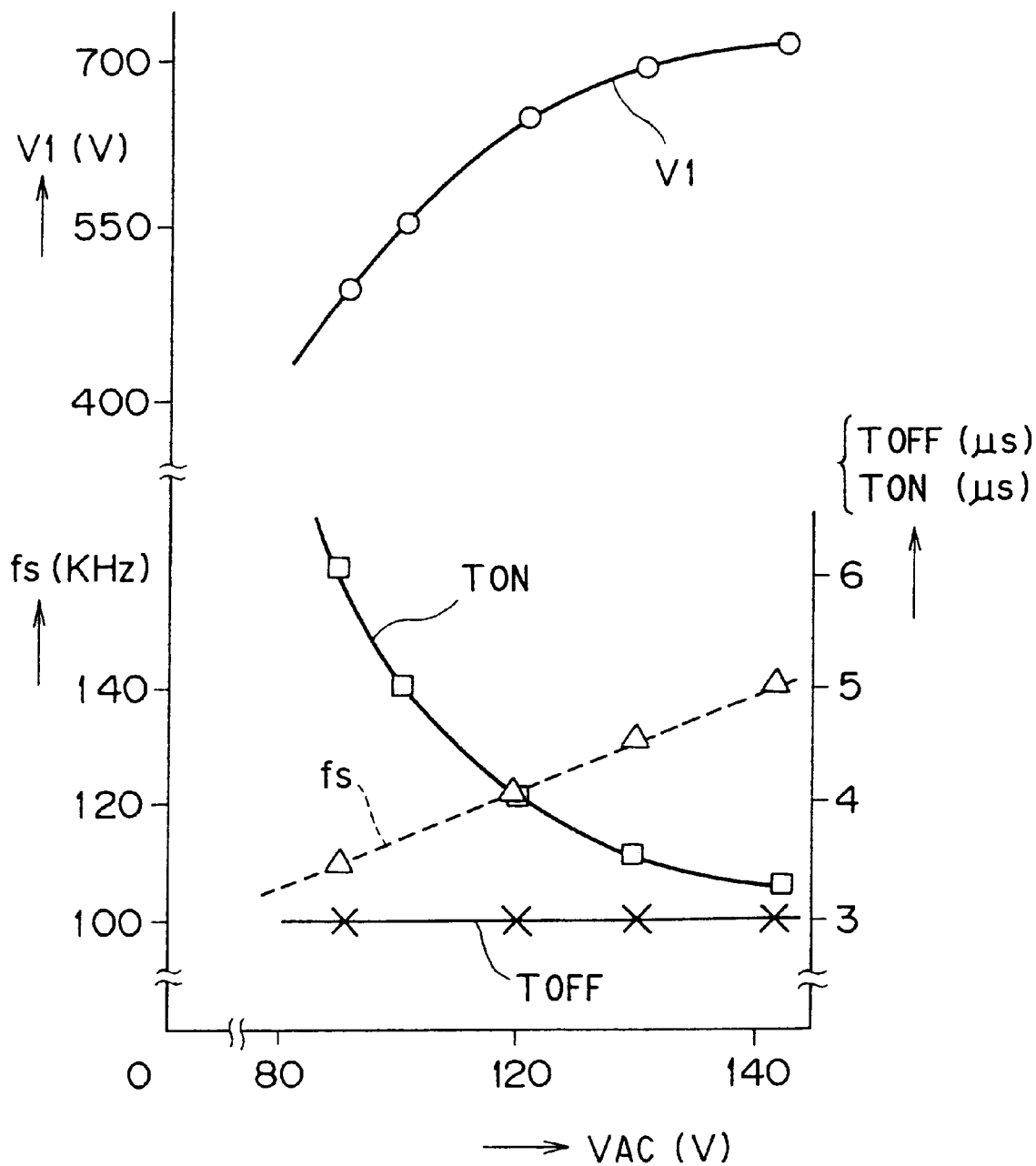
FIG. 9 is a diagram of assistance in explaining characteristics of the switching power supply circuit shown in FIG. 5 with respect to alternating input voltage.
Figure 10:
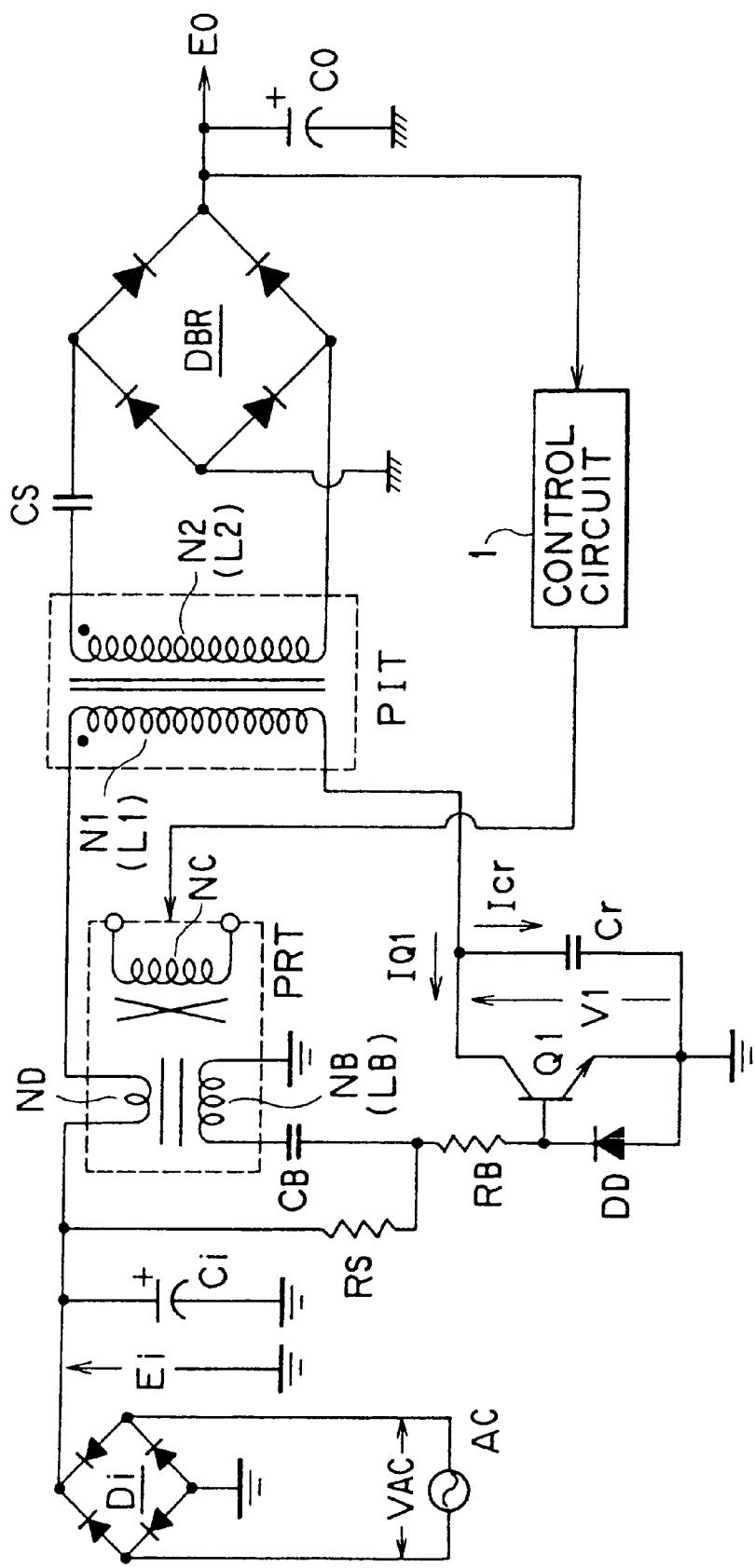
FIG. 10 is a circuit diagram showing another configuration example of a prior art switching power supply circuit.
Figure 12:
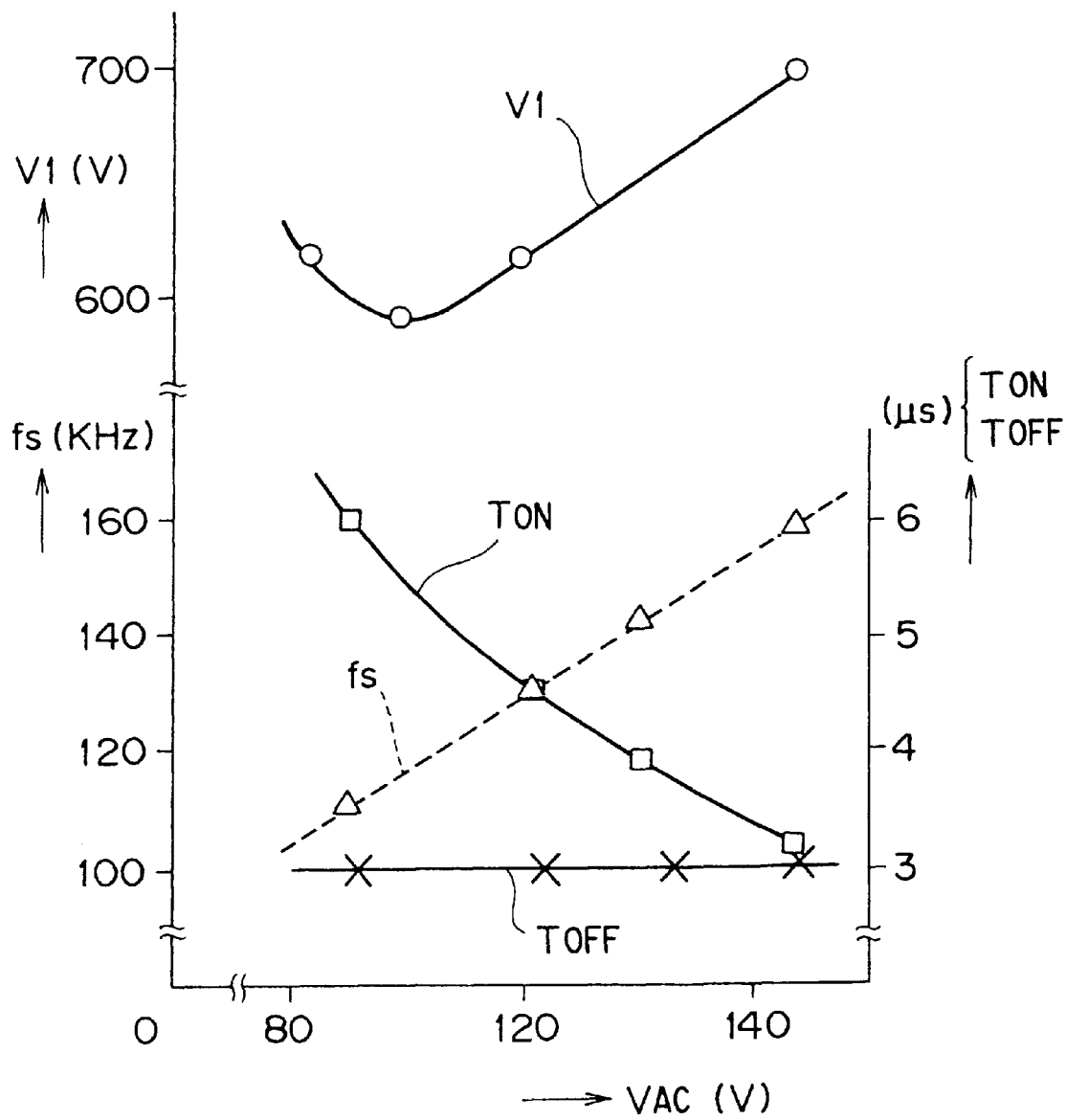
FIG. 12 is a diagram of assistance in explaining characteristics of the switching power supply circuit shown in FIG. 10 with respect to alternating input voltage.

As in FIG. 5, the power supply circuit shown in FIG. 1 is provided on the primary side with a self-excited, single-ended voltage resonance type converter and an orthogonal type control transformer PRT to effect control for constant voltage by the complex control method. An active clamp circuit 20A that operates by self-excitation is provided for the above configuration.

The active clamp circuit 20A is provided with a BJT (Bipolar Junction Transistor), for example, as an auxiliary switching device Q2. A collector of the auxiliary switching device Q2 is connected to a starting point of a primary winding N1 via a clamp capacitor CCL. In this case, the starting point of the primary winding N1 is connected to a positive terminal of a smoothing capacitor Ci via a current detecting winding ND. An emitter of the auxiliary switching device Q2 is connected to a collector of a switching device Q1. A base of the auxiliary switching device Q2 is connected with a self-oscillation driving circuit formed by connecting a base current limiting resistance RB1, a resonant capacitor CB2, and a driving winding LB2 in series with each other. One end of the driving winding LB2 is connected to an ending point of a detecting winding N1A of an isolating converter transformer PIT. The detecting winding N1A is provided by winding a wire several turns from an ending point of the primary winding N1 of the isolating converter transformer PIT, and outputs an alternating voltage induced by the primary winding N1 to the self-oscillation driving circuit. Since the ending point of the detecting winding N1A is connected to the self-oscillation driving circuit, a driving current of opposite polarity from the main switching device Q1 flows through the base of the auxiliary switching device Q2. A clamp diode that forms a path of a clamp current flowing when the auxiliary switching device Q2 is turned on is connected in parallel with the base and emitter of the auxiliary switching device Q2.

On the secondary side of the power supply circuit of FIG. 1, a secondary-side direct-current output voltage E01 is inputted from a branch point to a control circuit 1 as a detection voltage, and a secondary-side direct-current output voltage E02 lower than the secondary-side direct-current output voltage E01 is supplied as operating power to the control circuit 1.

FIGS. 2A, 2B, 2C, 2D, 2E, 2F, 2G, 2H, 2I, 2J, 2K, 2L, 2M, 2N, 2O, and 2P show operating waveforms of main parts in the power supply circuit of FIG. 1. FIGS. 2A to 2H show operations of parts in the circuit under conditions of an alternating input voltage VAC=100 V and a maximum load power of 200 W. FIGS. 2I to 2P show operations of the parts under conditions of an alternating input voltage VAC=100 V and a minimum load power of 20 W.

Figure 2:
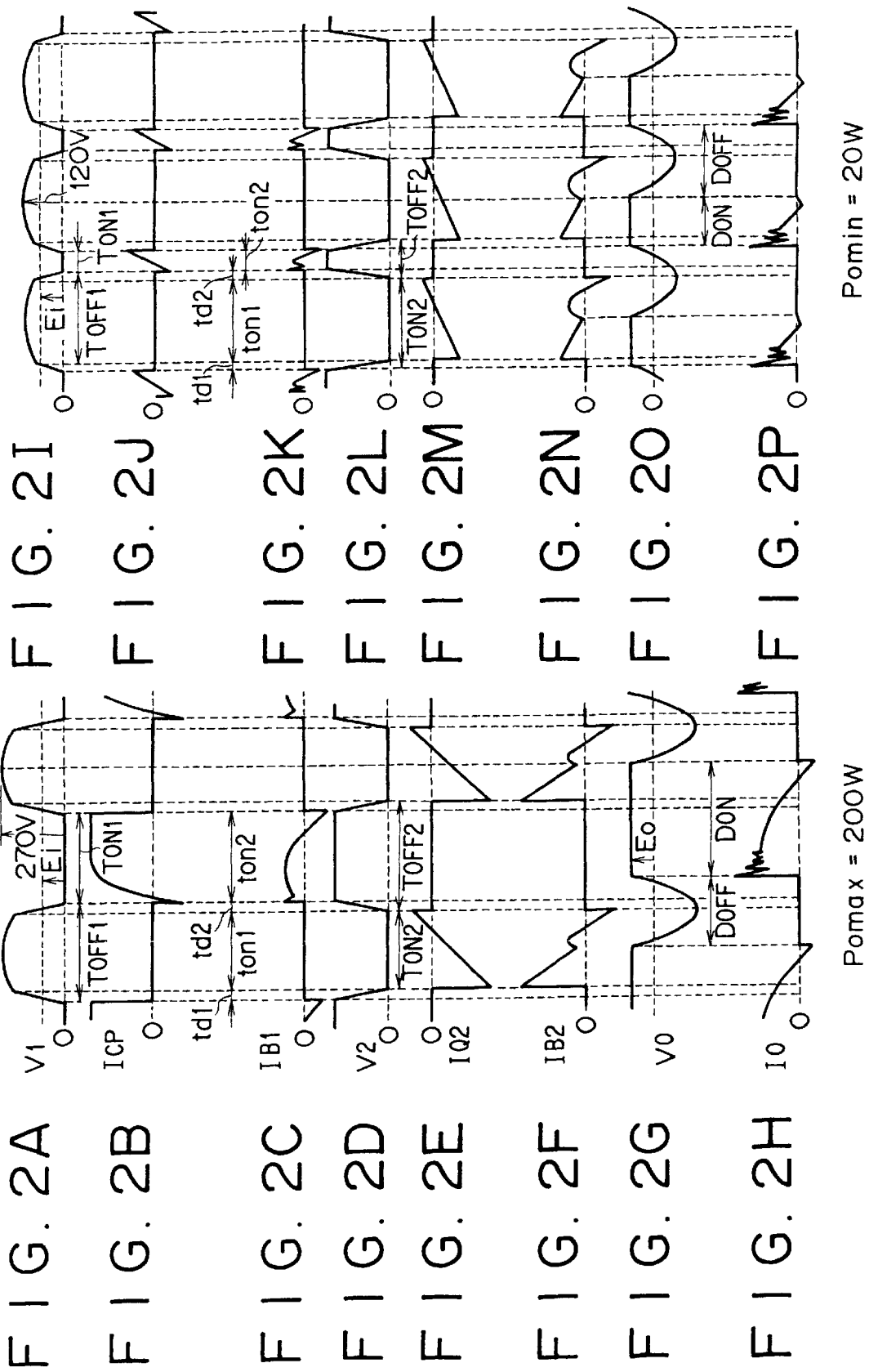
FIGS. 2A, 2B, 2C, 2D, 2E, 2F, 2G, 2H, 2I, 2J, 2K, 2L, 2M, 2N, 2O, and 2P are waveform diagrams showing operations of main parts in the switching power supply circuit of FIG. 1.

The operations at the maximum load power of 200 W shown in FIGS. 2A to 2H will be described. When the main switching device Q1 is controlled to be in an on state, a switching driving current IB1 from a self-oscillation driving circuit flows in a manner as shown in FIG. 2C. Specifically, the current IB1 is at a zero level during a period TOFF1, and supplies a current having a waveform shown in FIG. 2C to the base of the main switching device Q1 during a period TON1. The main switching device Q1 thereby repeats switching operation such that the main switching device Q1 is in an on state during the period TON1 and is in an off state during the period TOFF1 in one switching cycle.

As shown in FIG. 2B, a collector current Icp flowing through the collector of the main switching device Q1 is at a zero level during the period TOFF1. During the period TON1, a clamp current in a negative direction initially flows and thereafter a switching current in a positive direction having a waveform as shown in the figure flows from the collector through the emitter of the main switching device Q1. A parallel resonance voltage V1 is at a zero level during the period TON1, and forms a pulse waveform as shown in FIG. 2A during the period TOFF1.

A base current IB2 having a waveform shown in FIG. 2F flows from its self-oscillation driving circuit to the base of the auxiliary switching device Q2. A comparison of FIG. 2F with FIG. 2C indicates that the current IB2 and the base current IB1 of the main switching device are timed to become opposite to each other in polarity. Hence, the auxiliary switching device Q2 performs switching operation such that the auxiliary switching device Q2 is on during a period TON2 within the period TOFF1, during which the main switching device Q1 is turned off, and the auxiliary switching device Q2 is off during a remaining period TOFF2 within one switching cycle. In short, the main switching device Q1 and the auxiliary switching device Q2 are timed to perform on/off operation substantially alternately. This operation is also indicated by waveforms of a voltage V2 across the auxiliary switching device Q2 shown in FIG. 2D and a collector current IQ2 of the auxiliary switching device Q2, for example. The voltage V2 across the auxiliary switching device Q2 is at a zero level during the period TON2 and forms a pulse waveform as shown in the figure during the period TOFF2. The collector current IQ2 is at a zero level during the period TOFF2, and has a waveform that indicates a discharged current flowing from the clamp capacitor CCL to the primary winding N1 followed by a current flowing from the clamp capacitor CCL to the emitter via the collector during the period TON2.

The auxiliary switching device Q2 thus performs switching operation, whereby the levels of the parallel resonance voltage V1 shown in FIG. 2A and the voltage V2 across the auxiliary switching device Q2 shown in FIG. 2D are clamped to lower their peak levels.

As operation on the secondary side, FIG. 2G shows a secondary-side alternating voltage Vo and FIG. 2H shows a secondary-side rectified current Io.

At the minimum load power, the operating waveforms of the parts shown in FIGS. 2A to 2H become as shown in FIGS. 2I to 2P, respectively. For example, a comparison of FIG. 2I with FIG. 2A indicates that the switching operation of the main switching device Q1 is controlled by the complex control method. Specifically, the switching operation of the main switching device Q1 is controlled in such a manner that as the load becomes lighter, the switching frequency of the main switching device Q1 is raised, and at the same time the period TON1 within one switching cycle is shortened while the period TOFF1 is fixed. In synchronism with such control, the switching frequency of the auxiliary switching device Q2 is variably controlled such that as the load becomes lighter, the switching frequency of the auxiliary switching device Q2 is raised by shortening the period TOFF2 of the auxiliary switching device Q2 while the period TON2 is fixed. Under such a light load, as in the case of a heavy load, the peak levels of the primary-side parallel resonance voltage V1 and the voltage V2 across the auxiliary switching device Q2 are suppressed.

Figure 3:
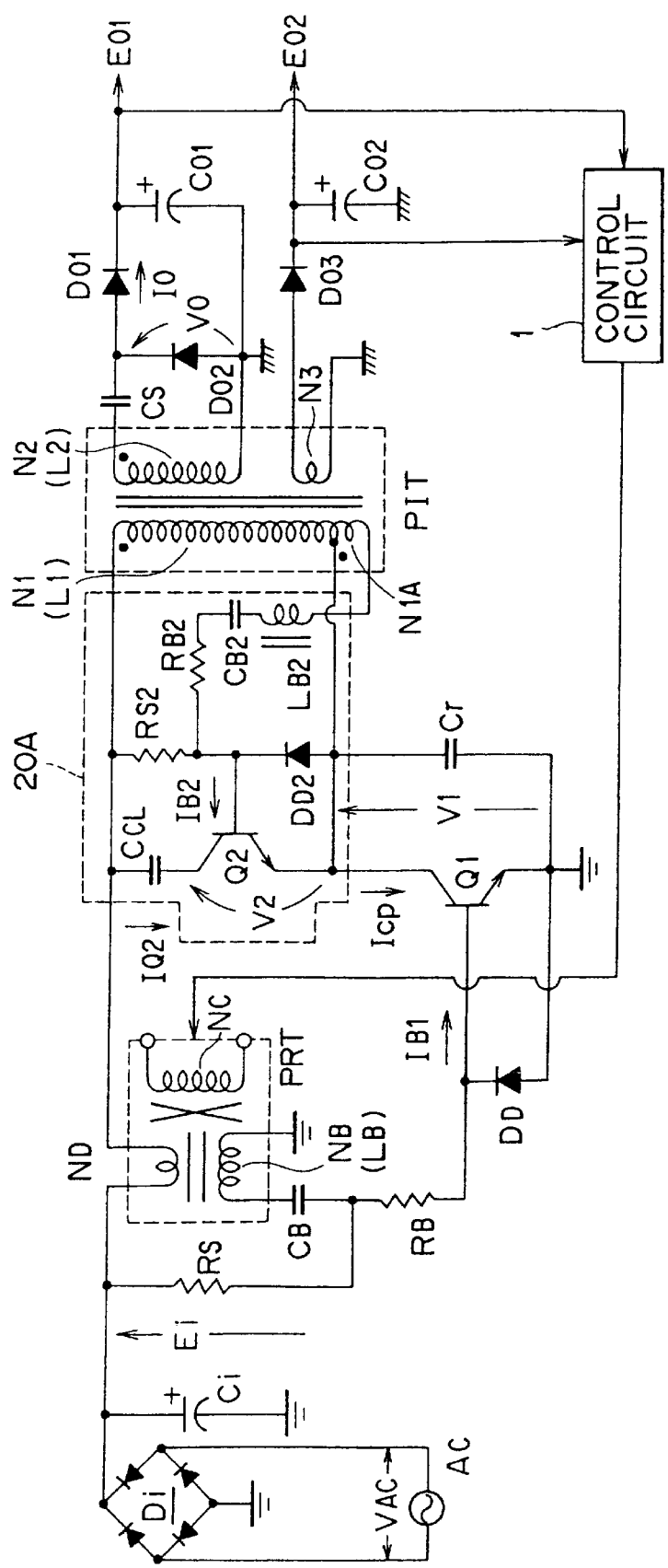
FIG. 3 is a circuit configuration diagram of a switching power supply circuit according to a second embodiment of the present invention.
Figure 4:
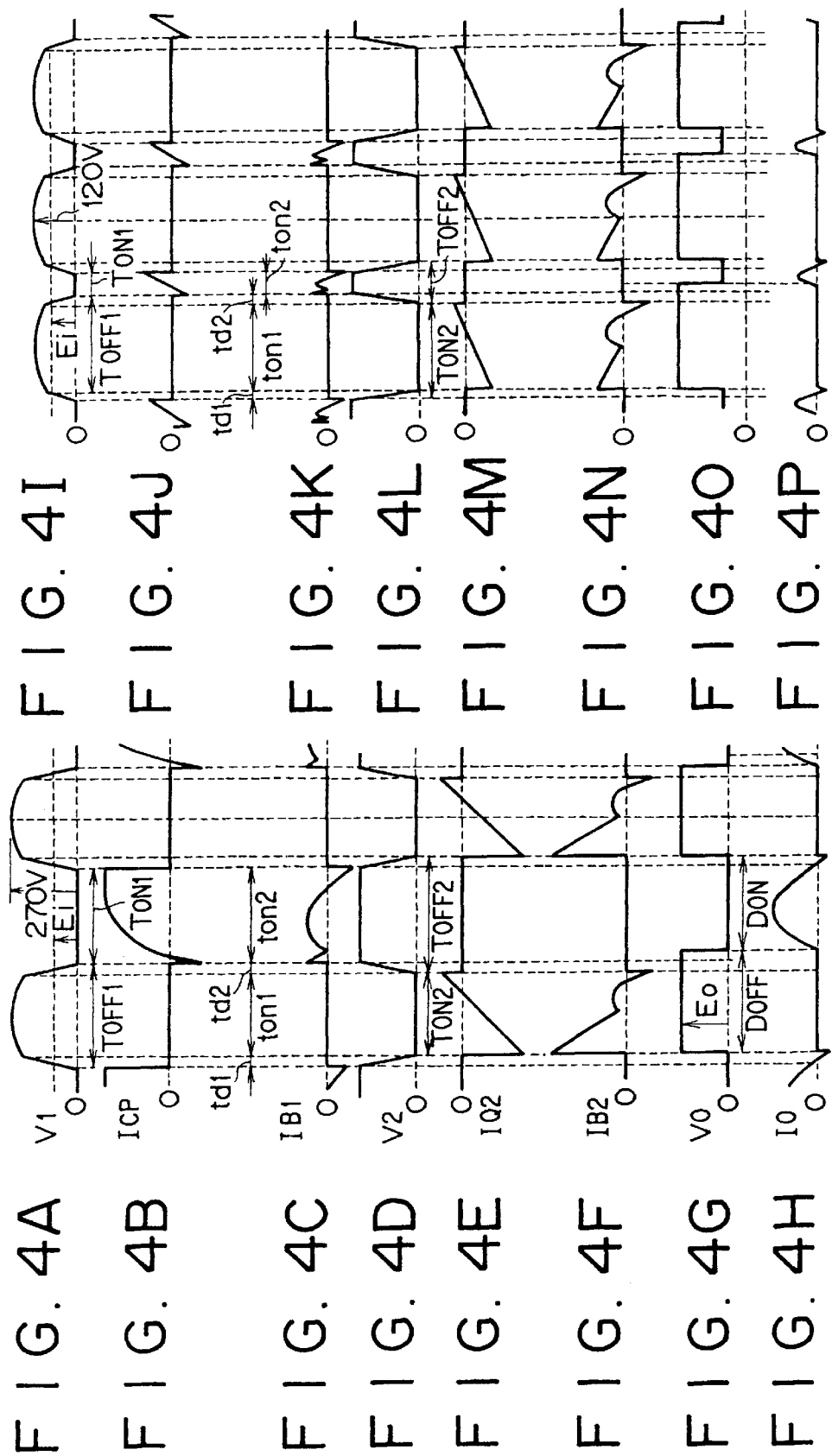
FIGS. 4A, 4B, 4C, 4D, 4E, 4F, 4G, 4H, 4I, 4J, 4K, 4L, 4M, 4N, 4O, and 4P are waveform diagrams showing operations of main parts in the switching power supply circuit of FIG. 3.

FIG. 3 is a circuit configuration diagram of a power supply circuit according to a second embodiment of the present invention. In the figure, the same parts as in FIG. 1 are identified by the same reference numerals, and their description will be omitted.

The power supply circuit shown in FIG. 3 is provided on the primary side with a self-excited, single-ended voltage resonance type converter, and further an active clamp circuit 20A is provided for the voltage resonance type converter. In this respect, the power supply circuit of FIG. 3 has the same configuration as the power supply circuit shown in FIG. 1. The power supply circuit of FIG. 3 is also configured as a complex resonance type switching converter; the power supply circuit has a voltage doubler rectifier circuit including a secondary-side series resonant capacitor Cs on the secondary side. Thus, the power supply circuit as a complex resonance type switching converter has a parallel resonant circuit for the voltage resonance type converter on the primary side and a series resonant circuit on the secondary side.

FIGS. 4A, 4B, 4C, 4D, 4E, 4F, 4G, 4H, 4I, 4J, 4K, 4L, 4M, 4N, 4O, and 4P show operating waveforms of the power supply circuit configured as shown in FIG. 3. Specifically, FIGS. 4A to 4H show operations of the parts (V1, Icp, IB1, V2, 102, IB2, Vo, and Io) under conditions of an alternating input voltage VAC=100 V and a maximum load power Pomax=200 W. FIGS. 4I to 4P show operations of the same parts as those of FIGS. 4A to 4H under conditions of an alternating input voltage VAC=100 V and a minimum load power Pomin=20 W.

The operating waveforms of the parts on the primary side shown in FIGS. 4A to 4E and FIGS. 4I to 4N are substantially the same as those shown in FIGS. 2A to 2E and FIGS. 2I to 2N. Thus, the active clamp circuit 20A in the power supply circuit of FIG. 3 operates so as to suppress the peak levels of a parallel resonance voltage V1 and a voltage V2 across an auxiliary switching device Q2.

It is to be noted that embodiments of the present invention are not limited to the configurations shown in the drawings. For example, as the switching device and the auxiliary switching device that play a main role in the embodiments described above, BJTs (Bipolar Junction Transistors) are used; however, other devices may also be employed. Also, configuration of the switching driver for self-excitation does not need to be limited to those shown in the drawings; it may be modified into an appropriate circuit configuration as required. The rectifier circuit on the secondary side including the secondary-side resonant circuit is not limited to the configurations shown in the drawings as embodiments of the present invention; the rectifier circuit may employ different circuit configurations.

What is claimed is:

1. A switching power supply circuit comprising:
   switching means including a main switching device for interrupting an inputted direct-current input voltage for output;
   a primary-side parallel resonant capacitor for forming a primary-side parallel resonant circuit that converts operation of said switching means into voltage resonance type operation;
   an isolating converter transformer for transmitting an output of said switching means obtained in a primary winding of the isolating converter transformer to a secondary winding thereof, the isolating converter transformer being formed so as to have loose coupling at a required coupling coefficient between the primary winding and the secondary winding;
   a secondary-side resonant circuit formed by connecting a secondary-side resonant capacitor to the secondary winding of said isolating converter transformer;
   a direct-current output voltage generating means for rectifying an alternating voltage inputted from the secondary winding of said isolating converter transformer and thereby providing a secondary-side direct-current output voltage;
   switching driving means for effecting control for constant voltage by driving said switching means for switching operation such that switching frequency of said switching means is variably controlled according to level of said secondary-side direct-current output voltage, and at the same time an on period of said switching means within one switching cycle is variably controlled while an off period thereof is fixed; and
   active clamp means for clamping a primary-side parallel resonance voltage generated across said primary-side parallel resonant capacitor, the active clamp means including an auxiliary switching device that is driven for switching operation such that the auxiliary switching device and said switching means perform on/off operation substantially alternately.

2. The switching power supply circuit as claimed in claim 1,
   wherein the secondary-side resonant capacitor is connected in parallel or in series with the secondary winding of said isolating converter transformer.

3. The switching power supply circuit as claimed in claim 1, wherein said switching driving means comprises:
   an orthogonal transformer having a detecting winding for detecting a resonance current; a driving winding for driving said switching means; and a control winding wound in a direction orthogonal to said detecting winding and said driving winding;
   wherein inductance of said driving winding is changed by changing a current flowing in said control winding according to a level of said secondary-side direct current output voltage, whereby the switching frequency of said switching means is variably controlled.

* * * * *